UNITED STATES PATENT OFFICE 2,357,466

BENEFICIATION OF VANADIUM COMPOUNDS

Frederick F. Frick, Anaconda, Mont., assignor to Anaconda Copper Mining Company, a corporation of Montana No Drawing. Application October 3, 1942,
Serial No. 460,681

2 Claims. (Cl. 23—22)

This invention relates to the beneficiation of vanadium compounds, and more particularly to the treatment of alkali metal vanadates for the purpose of recovering high grade vanadium oxide therefrom.

In the recovery of vanadium from certain of its ores, the ore is treated in a furnace with common salt (sodium chloride). As a result of this treatment, the vanadium is converted to sodium metavanadate, which is leached with water from the furnace product. A relatively pure sodium metavanadate solution is thus produced.

In another process, used for the recovery of vanadium from phosphate rock in the course of producing phosphoric acid therefrom, an impure phosphato-vanadic acid is separated from the phosphoric acid. This phosphato-vanadic acid is treated, under suitably controlled conditions, with soda ash and milk of lime. As a result of this treatment, most of the vanadium is converted to soluble sodium metavanadate, which remains in aqueous solution, and most of the impurities are separated in the form of insoluble residues.

It is characteristic of the foregoing and other similar processes, as heretofore practiced, that the vanadium ultimately appears in an aqueous solution of sodium (or other alkali metal) vanadate solution. A well-known method for recovering vanadium from such solutions is by precipitation with sulphuric acid. The reaction between the sodium metavanadate and the sulphuric acid sometimes erroneously is given as (1) 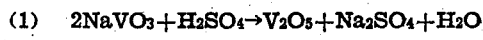 $2NaVO_3 + H_2SO_4 \rightarrow V_2O_5 + Na_2SO_4 + H_2O$ but actually the reaction that takes place is as follows:

(2) $6NaVO_3 + 2H_2SO_4 \rightarrow$
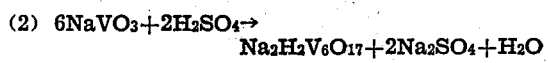 $Na_2H_2V_6O_{17} + 2Na_2SO_4 + H_2O$ The vanadium product of the reaction is di-sodium hexavanadate, or "red cake," which contains 87.21% $V_2O_5$. Upon heating to the fusion temperature, one molecule of water is eliminated from the "red cake" and an anhydrous di-sodium hexavanadate ($Na_2V_6O_{16}$) is formed. This product contains 89.8% $V_2O_5$ and 10.2% $Na_2O$. Theoretically this is the highest content of $V_2O_5$ which it is possible to obtain by heating "red cake."

The present invention provides a method for beneficiating alkali metal vanadates, such as sodium metavanadate or di-sodium hexavanadate, so that vanadium pentoxide products containing substantially more than 89.8% $V_2O_5$ may be made therefrom.

I have discovered that alkali metal vanadates may be reacted with soluble ammonium salts to form vanadates which may be recovered in the form of a solid ammonium vanadate, and that ammonium compounds thus produced, upon being heated to a sufficiently high temperature, liberate ammonia and yield substantially pure vanadium pentoxide.

Based upon this discovery, the present invention provides a method for producing a vanadium oxide product of high quality from an alkali metal vanadate which comprises treating said vanadate with a soluble ammonium salt, advantageously an ammonium halide, in such manner as to convert it to an ammonium vanadate product. This product is recovered in solid form, and is heated to a sufficiently high temperature to eliminate ammonia therefrom and to form substantially pure vanadium oxide.

The alkali metal vanadate to be treated may be any of the usual vanadate products, such as a metavanadate or a hexavanadate, soluble or insoluble. Any of the ordinary soluble ammonium salts may be used for treating the vanadate in the process of the invention, but I prefer to use one of the less expensive ammonium salts, such as ammonium chloride (sal ammoniac).

If an insoluble vanadate, such as "red cake," is to be treated in accordance with the invention, it is advantageously introduced into suspension in an aqueous solution of a soluble ammonium salt, and is maintained in the solution for a sufficient period of time for reaction to occur between the ammonium compound and the vanadate. The solid reaction product, composed largely of an ammonium vanadate, is then separated from the residual liquor, and is heated to eliminate ammonia and to form vanadium pentoxide. If a soluble vanadate, such as sodium metavanadate, is to be treated, it is treated in aqueous solution with a soluble ammonium salt for a sufficient period of time for the reaction to occur, after which an insoluble ammonium vanadate may be precipitated from the solution. The precipitated ammonium vanadate then may be heated as described above.

A better understanding of the invention will be had from a consideration of the following descriptions of the treatment of an insoluble alkali metal vanadate (di-sodium hexavanadate, or "red cake") and of a soluble alkali metal vanadate (sodium metavanadate) in accordance with the invention. It is understood, however, that the following specific examples are presented by way of illustration only, and that the scope of the invention is not limited thereto.

Treatment of an insoluble alkali metal vanadate

Di-sodium hexavanadate, or "red cake," is perhaps the most common of the insoluble alkali metal vanadates commercially produced in processes for the recovery of vanadium oxide. In treating this product in accordance with the invention, it is introduced into aqueous suspension, and therein is treated with a soluble ammonium salt, advantageously a halide such as ammonium chloride. It is generally advantageous, but not essential, to maintain the suspension at an elevated temperature, say at about 60° C. to 80° C., and to agitate the suspension, during the treatment. The following reaction appears to occur.

(3) $Na_2H_2V_6O_{17} + 2NH_4Cl \rightarrow (NH_4)_2H_2V_6O_{17} + 2NaCl$

The product, di-ammonium hexavanadate, is insoluble, and may be separated from the residual solution by filtration, decantation, or other procedure. When the separated di-ammonium hexavanadate is heated to 200° C., a molecule of water appears to be eliminated, thus:

(4) $(NH_4)_2H_2V_6O_{17} \rightarrow (NH_4)_2V_6O_{16} + H_2O$

Upon further heating to 300° C., the following reactions appear to take place:

(5) $(NH_4)_2V_6O_{16} \rightarrow H_2V_6O_{16} + 2NH_3$
(6) $H_2V_6O_{16} \rightarrow 3V_2O_5 + H_2O$ The final product of this heating operation is substantially pure vanadium pentoxide, uncontaminated by the presence of any alkali metal, and eminently suited for metallurgical reduction to produce ferrovanadium, or for other uses.

The reaction between the "red cake" and the ammonium chloride or other ammonium salt appears to come to substantial equilibrium before reaching completion, and the reaction is therefore influenced by the law of mass action. Apparently for this reason, the best results are secured if the treatment with the soluble ammonium salt is carried out in two or more steps, with separation of the solid reaction product from the residual liquor between each step. For commercial purposes, I have found that treatment in three such steps is generally most economic and satisfactory.

In a three-step process, the "red cake" is introduced into aqueous suspension and approximately the equivalent quantity of ammonium chloride or other soluble ammonium salt is added to the suspension, wherein it is dissolved in the aqueous medium. After a treatment period of sufficient time for the reaction to proceed to substantial equilibrium (generally about 15 minutes), the solid reaction product is separated from the residual solution by filtration, decantation, or other means. The separated solid product is again suspended in an aqueous medium, and again ammonium chloride or other soluble ammonium salt is added. After a second treatment period of about 15 minutes, the solid reaction product is separated by decantation, filtration, or the like from the residual liquor. Once more the solid reaction product is suspended in an aqueous medium, and a third quantity of ammonium chloride or other soluble ammonium salt is added. After allowing time for the reaction to proceed to substantial equilibrium (again about 15 minutes), the solid reaction product is separated from the solution. The separated solid product from this third step of the treatment may then be washed thoroughly, after which it is in condition for heating to dehydrate and to convert to vanadium pentoxide.

The following tabulation indicates the results secured by treatment of "red cake" in the above-described manner. The material treated was reacted with ammonium chloride in three steps as above described, and samples of the reaction product at the end of each step of the treatment were taken to show the improvement in grade of the product with each successive step. The tabulation gives the results of two separate tests, each of which was conducted in three steps. As shown in the tabulation, the grade of the vanadium pentoxide product was increased from about 90% in the original "red cake" to about 95% as a result of the first treatment step. The two subsequent treatment steps still further increased the grade of the product to about 99% vanadium pentoxide.

*Treatment of "red cake" with ammonium chloride*

|  | Step number ||||||
|---|---|---|---|---|---|---|
|  | Test A ||| Test B |||
|  | 1 | 2 | 3 | 1 | 2 | 3 |
| Per cent H₂O in "red cake" to first step | 2.17 | | | 3.3 | | |
| Per cent V₂O₅ @ 200° C. in "red cake" to first step | 89.87 | | | 90.1 | | |
| Treatment temperature °C | 65-70 | 65-70 | 65-70 | 70-75 | 70-75 | 70-75 |
| Time of treatment minutes | 15 | 15 | 15 | 35 | 35 | 35 |
| Concentration of NH₄Cl in treatment liquor grams per liter | 71.4 | 71.4 | 71.4 | 71.0 | 62.1 | 53.3 |
| Ratio, weight NH₄Cl used per unit weight V₂O₅ in original "red cake" | 0.195 | 0.195 | 0.195 | 0.194 | 0.194 | 0.194 |
| Per cent V₂O₅ in reaction product after heating to 300° C | 95.3 | 97.7 | 99.2 | 94.6 | 97.5 | 99.0 |

Treatment of a soluble alkali metal vanadate

Sodium metavanadate is a typical, and perhaps the most common, soluble alkali metal vanadate produced in the course of recovering vanadium from vanadium-bearing materials. I have found that such voluble vanadates also react with soluble ammonium salts, and that the reaction product may be precipitated as a di-ammonium hexavanadate which may be converted to substantially pure vanadium pentoxide by heating to 300° C. In treating a soluble alkali metal vanadate, such as sodium metavanadate, the metavanadate in aqueous solution is treated with a soluble ammonium salt, advantageously an inexpensive ammonium salt such as ammonium chloride. This treatment appears to cause the following reaction to occur:

(7) $NaVO_3 + NH_4Cl \rightarrow NH_4VO_3 + NaCl$

The solution, after treatment with the ammonium chloride or other soluble ammonium salt, may be treated with sulphuric acid to cause precipitation of a di-ammonium hexavanadate, probably in accordance with the following reaction:

(8) $6NH_4VO_3 + 2H_2SO_4 \rightarrow (NH_4)_2H_2V_6O_{17} + 2(NH_4)_2SO_4 + H_2O$ The di-ammonium hexavanadate precipitate, after separation from the residual liquor, may be heated for purposes of dehydration and elimination of ammonia, probably in accordance with reactions (4), (5), and (6) above, to produce a substantially pure vanadium pentoxide product.

In this case again, as in treating insoluble alkali metal vanadates, the reaction of the sodium metavanadate with the ammonium salt appears to reach an equilibrium at some point short of completion. By increasing the amount of ammonium chloride or other ammonium salt used to substantially more than the amount theoretically required by reaction (7) above, the point of equilibrium apparently is shifted in a direction which favors the production of a higher grade final product. The amount of ammonium chloride or other soluble ammonium salt used in excess of the amount theoretically required will of course be governed by the economic balance between the increased cost involved in the use of excess reagent against the increased value of the higher grade product obtained as a result of the use of such excess reagent.

The following tabulation shows the results obtained by the treatment of a sodium metavanadate solution with ammonium chloride. The results of two tests are given. In the first test, the amount of ammonium chloride used was the amount theoretically required to react with the amount of sodium metavanadate present in the solution. In the second test, the amount of ammonium chloride used was twice the theoretical amount. As shown by the tabulation, the vanadium pentoxide content of the product obtained by fusion at 300° C. of the di-ammonium hexavanadate precipitated from the treated solution was about 97% in the case of test No.1 (using the theoretical amount of ammonium chloride) and somewhat more than 98% in the case of test No. 2 (using twice the theoretical amount of ammonium chloride). These products may be compared with the product containing about 90% vanadium pentoxide which is the highest grade product it would be possible to produce by fusion of the precipitated hexavanadate were the solution not first treated with ammonium chloride or other soluble ammonium salt:

*Treatment of sodium metavanadate solution with ammonium chloride*

| | Test #1 | Test #2 |
|---|---|---|
| Vanadium content of original $NaVO_3$ solution, expressed as $V_2O_5$ ............grams per liter.. | 38.5 | 38.5 |
| Amount of $NH_4Cl$ used....................do.... | 22.7 | 45.3 |
| Ratio, grams $NH_4Cl$ per gram $V_2O_5$............ | 0.588 | 1.176 |
| Ratio, grams $NH_4Cl$ actually used to grams theoretically required............................ | 1 | 2 |
| Per cent $V_2O_5$ in precipitate after fusion at 300° C............................................ | 97.4 | 98.6 |

Although particular reference has been made in the foregoing description to the use of ammonium chloride as the reagent for treating the alkali metal vanadate, it is to be noted that other soluble ammonium salts may be used effectively. For example, other ammonium halides are entirely practical from a chemical standpoint, but their cost is somewhat higher than the chloride. Other ammonium salts, such as ammonium sulphate, ammonium citrate, etc., may be used. Similarly, the process is not limited in its utility to the treatment of sodium vanadates, although such compounds have received particular mention in the foregoing specific description. Other alkali metal vanadates may be treated in the same manner and equally as effectively as the sodium compounds by the method of the invention. It is also apparent that the ammonia liberated when the precipitated ammonium vanadate is heated to the fusion temperature may be recovered by usual methods and may be used in the treatment of additional quantities of alkali metal vanadate.

I claim:

1. The method of producing vanadium oxide of high quality from an insoluble alkali metal hexavanadate which comprises introducing said material into suspension in an aqueous solution of an ammonium halide, maintaining said material in suspension for a sufficient period of time for reaction to occur between the ammonium halide and the hexavanadate, separating the solid reaction product comprising a substantial proportion of an ammonium hexavanadate from the residual solution, introducing the separated product at least once again into suspension in an aqueous solution of an ammonium halide and maintaining it therein for a sufficient period of time to procure further reaction with the ammonium halide and to form a further quantity of an ammonium hexavanadate in the solid reaction product, again separating said product from the residual solution, and subsequently heating the reaction product at a temperature of the order of 300° C. for a sufficient period of time to eliminate ammonia therefrom and to form a vanadium oxide product of high quality.

2. In a process for the recovery of vanadium involving production of an insoluble alkali metal vanadate, the improvement which comprises treating the insoluble alkali metal vanadate with a solution containing an ammonium salt for a sufficient period of time to convert at least a substantial part of the alkali metal vanadate to an insoluble ammonium vanadate, separating the insoluble reaction product from the residual liquor, and treating the separated product at least once again with a further quantity of solution containing an ammonium salt for a sufficient period of time to convert a further proportion of the alkali metal vanadate to an insoluble ammonium vanadate.

FREDERICK F. FRICK.